US008456350B2

(12) United States Patent
Wood

(10) Patent No.: US 8,456,350 B2
(45) Date of Patent: *Jun. 4, 2013

(54) METHODS AND APPARATUS FOR SEA STATE MEASUREMENT VIA RADAR SEA CLUTTER ECCENTRICITY

(75) Inventor: Thomas E. Wood, Portsmouth, RI (US)

(73) Assignee: Raytheon Company, Waltham, MA (US)

( * ) Notice: Subject to any disclaimer, the term of this patent is extended or adjusted under 35 U.S.C. 154(b) by 307 days.

This patent is subject to a terminal disclaimer.

(21) Appl. No.: 12/971,359

(22) Filed: Dec. 17, 2010

(65) Prior Publication Data
US 2012/0154204 A1    Jun. 21, 2012

(51) Int. Cl.
*G01S 13/88*    (2006.01)
(52) U.S. Cl.
USPC .......................................................... 342/159
(58) Field of Classification Search
USPC ................................................. 342/159–164
See application file for complete search history.

(56) References Cited

U.S. PATENT DOCUMENTS

| | | |
|---|---|---|
| 3,806,923 A | 4/1974 | Tsuruta et al. |
| 4,386,353 A | 5/1983 | Bleijerveld et al. |
| 4,394,658 A | 7/1983 | Short |
| 4,542,381 A | 9/1985 | Wilhelm |
| 4,684,950 A | 8/1987 | Long |
| 4,766,435 A | 8/1988 | Wells |
| 4,780,720 A | 10/1988 | Watts |
| 4,837,579 A | 6/1989 | Pease et al. |
| 5,177,487 A | 1/1993 | Taylor et al. |
| 5,327,141 A | 7/1994 | Sheldon |
| 5,337,055 A | 8/1994 | Ghignoni |
| 5,451,961 A | 9/1995 | Rubin et al. |
| 5,546,084 A | 8/1996 | Hindman |
| 5,546,089 A | 8/1996 | Talbot |
| 5,576,712 A | 11/1996 | Bian et al. |
| 5,686,919 A | 11/1997 | Jordan et al. |
| 5,754,140 A | 5/1998 | Starr et al. |
| 6,038,526 A | 3/2000 | Stein |
| 6,130,639 A | 10/2000 | Agnesina et al. |
| 6,188,350 B1 | 2/2001 | Neumerkel et al. |
| 6,911,933 B1 | 6/2005 | Mutz et al. |
| 7,006,031 B1 | 2/2006 | Abatzoglou et al. |
| 7,079,991 B2 | 7/2006 | Li et al. |
| 7,259,715 B1 | 8/2007 | Garren et al. |
| 7,515,098 B1 | 4/2009 | Garren et al. |
| 7,538,712 B2 | 5/2009 | Allen et al. |
| 7,598,899 B2 | 10/2009 | Allen et al. |

(Continued)

FOREIGN PATENT DOCUMENTS
WO        WO 9513547          5/1995

OTHER PUBLICATIONS

Notification of Transmittal of the International Search Report, PCT/US2008/053261, date of mailing Aug. 26, 2008, 4 pages.

(Continued)

*Primary Examiner* — Jack Keith
*Assistant Examiner* — Matthew M Barker
(74) *Attorney, Agent, or Firm* — Daly, Crowley, Mofford & Durkee, LLP

(57) ABSTRACT

Methods and apparatus to fit the range extent of radar sea clutter to an ellipse to determine sea state. From one or more ellipse parameters, a sea state, which can include direction, can be identified. In one embodiment, the system autonomously determines the sea state and automatically selects non-isotropic STC filtering based on the ellipse that measures the sea state.

19 Claims, 17 Drawing Sheets

U.S. PATENT DOCUMENTS

| | | |
|---|---|---|
| 7,796,082 B2 | 9/2010 | Wood |
| 2008/0191929 A1 | 8/2008 | Wood |
| 2011/0291877 A1 | 12/2011 | Habboosh et al. |

OTHER PUBLICATIONS

Written Opinion of the International Searching Authority, PCT/US2008/053261, date of mailing Aug. 26, 2008, 8 pages.
Notification Concerning Transmittal of International Preliminary Report on Patentability (Chapter 1 of the Patent Cooperation Treaty), PCT/US2008/053261, date of mailing Aug. 20, 2009, 2 pages.
Written Opinion of the International Searching Authority, PCT/US2008/053261 date of mailing Aug. 20, 2009, 7 pages.
Xie et al., "A Multiple-Model Prediction Approach for Sea Clutter Modeling", IEEE Transactions on Geoscience and Remote Sensing, vol. 41, No. 6, Jun. 2003, pp. 1491-1502.
Lu et al., "A Piecewise Parametric Method Based on Polynomial Phase Model to Compensate Ionospheric Phase Contamination", Proceedings of ICASSO 2003, vol. II, p. 405-408.
Lu et al., "Ionoshperic Decontamination and Sea Clutter Suppression for HF Skywave Radars", IEEE Journal of Oceanic Engineering, vol. 30, No. 2, Apr. 2005, pp. 455-462.
U.S. Appl. No. 12/791,038, filed Jun. 1, 2010.
U.S. Appl. No. 12/971,707, filed Dec. 17, 2010.
Office Action dated Nov. 23, 2011 from U.S. Appl. No. 12/791,038, 14 pages.
Notice of Allowance and Fee(s) Due, date mailed Jan. 25, 2012, from U.S. Appl. No. 12/791,038, 9 pages.
Office Action dated Jan. 29, 2013 for U.S. Appl. No. 12/971,707, filed Dec. 17, 2010, 13 pages.
Response to Office Action dated Jan. 29, 2013 filed on Feb. 4, 2013 for U.S. Appl. No. 12/971,707, 14 pages.

METHODS AND APPARATUS FOR SEA STATE MEASUREMENT VIA RADAR SEA CLUTTER ECCENTRICITY

BACKGROUND

As is known in the art, the roughness of the ocean surface is described by the convention of sea state and direction. There are several known sea state conventions, such as the World Meteorological Organization sea state code and the Douglas scale. United States Navy traditions for describing sea state have come from the "American Practical Navigator," by N. Bowditch, while Europeans often specify sea state indirectly through reference to the Beaufort wind scale.

Related to sea state, but with more precision, is the notion of wave height described as "significant wave height" or Root Mean Squared (RMS) wave height. These descriptive single values summarize the scientific description of the ocean surface that requires a variety of parameters. In particular, the sea surface is more precisely described using spectral parameters of the waves.

As is known in the art, sea state estimation can be an important consideration in many applications, such as oil platform operation, safe boat handling, navigation, and sensor (radar) performance prediction. Traditionally, experienced mariners have visually estimated sea state, but this technique is somewhat arbitrary.

SUMMARY

The present invention provides methods and apparatus for sea state measurement from one or more parameters of an ellipse fitted to radar sea clutter. With this arrangement, sea state can be autonomously determined. In one embodiment, Sensitivity Time Control (STC) filtering can be automatically selected based upon sea state and/or sea clutter information. While exemplary embodiments of the invention are shown and described in conjunction with particular data, ellipse processing techniques, and radars, it is understood that embodiments of the invention are applicable to radars in general for which it is desirable to determine sea state.

In one aspect of the invention, a method comprises receiving radar return information from signals transmitted by a radar, processing the radar return information to identify sea clutter, and processing, using a processor, the sea clutter to fit an ellipse to a range horizon of the sea clutter as a function of azimuth to determine a sea state.

The method can further include one or more of the following features: determining a direction for the sea state based upon at least one parameter of the ellipse, generating an alert when the range horizon of the sea clutter does not fit an ellipse with a predetermined criteria, generating an alert when the range horizon for the sea clutter cannot be determined, using ratios of order statistics to form a range profile for the sea clutter, determining the range horizon for the sea clutter from a corner point of the range profile from the ratios of order statistics, determining the direction for the sea state from a direction of the major axis of the ellipse, determining the sea state from an eccentricity of the ellipse, determining the sea state from a ratio of a length of an offset of the ellipse to a semi-major axis of the ellipse, and/or mapping at least one parameter of the ellipse to sea states, using a Fourier Transform to determine one or more parameters of the ellipse.

In another aspect of the invention, an article comprises non-transitory instructions stored on a computer readable medium to enable a machine to perform: receiving radar return information from signals transmitted by a radar, processing the radar return information to identify sea clutter, and processing the sea clutter to fit an ellipse to a range horizon of the sea clutter to determine a sea state.

The article can further include one or more of the following features: determining a direction for the sea state based upon at least one parameter of the ellipse, generating an alert when the range horizon of the sea clutter does not fit an ellipse with a predetermined criteria, generating an alert when the range horizon for the sea clutter cannot be determined, using ratios of order statistics to form a range profile for the sea clutter, determining the range horizon for the sea clutter from a corner point of the range profile from the ratios of order statistics, determining the direction for the sea state from a direction of the major axis of the ellipse, determining the sea state from an eccentricity of the ellipse, determining the sea state from a ratio of a length of an offset of the ellipse to a semi-major axis of the ellipse, and/or mapping at least one parameter of the ellipse to sea states, using a Fourier Transform to determine one or more parameters of the ellipse.

In a further aspect of the invention, a radar system comprises: an antenna to receive radar return, and a processor to process the radar return to identify sea clutter and fit a range horizon of the sea clutter to an ellipse to determine a sea state. The system can determine a direction for the sea state based upon at least one parameter of the ellipse.

BRIEF DESCRIPTION OF THE DRAWINGS

The foregoing features of this invention, as well as the invention itself, may be more fully understood from the following description of the drawings in which.

DETAILED DESCRIPTION

Figure 1:
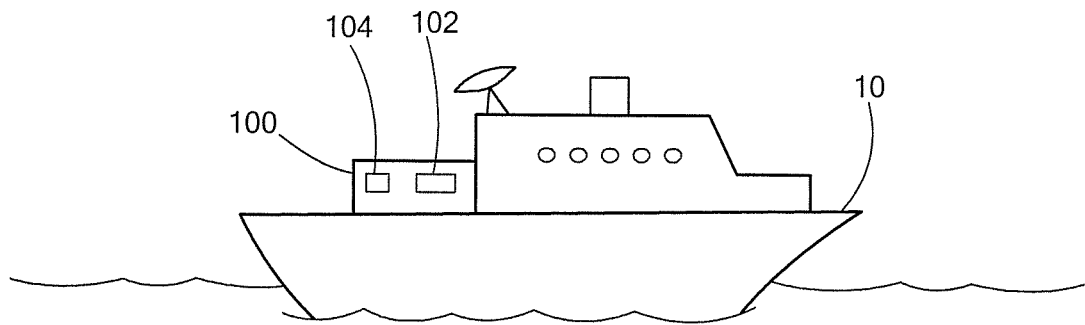
FIG. 1 is a pictorial representation of a shipboard radar system having sea state processing in accordance with exemplary embodiments of the invention.

FIG. 1 shows an exemplary radar system 100 having sea state processing in accordance with exemplary embodiments of the invention. The radar system 100 can be located on a vehicle 10, such as a ship, or at a fixed location. The radar system 100 includes a signal processing module 102 and a sea state processing module 104 to automatically identify sea state, as discussed in detail below.

Figure 1A:
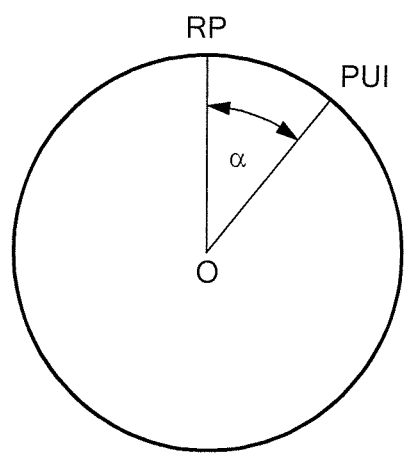
FIG. 1A is a schematic representation of azimuth for the radar system of FIG. 1.

In general, exemplary embodiments of the present invention include sea state estimation based upon eccentricity of detected sea clutter and/or other parameters of an ellipse fitted to the sea clutter. Mean sea clutter levels are a function of range, referred to as the range profile, as well as azimuth. That is, sea clutter is elliptical, i.e., non-isotropic, as described, for example, in FIG. 9.23 on page 295 of "*Sea Clutter: Scattering, the K Distribution and Radar Performance*," by Keith D. Ward, Robert J. A. Tough and Simon Watts, IET Publishers, London, 2006. It is understood that conventional sea clutter models are isotropic, i.e., do not take azimuth into account when processing for STC and/or extraction of targets using a technique of Constant False Alarm Rate (CFAR) thresholding. As is known in the art, azimuth refers to an angle in a spherical coordinate system defined as the angle α between a reference point RP and a point of interest POI for an observer O, as shown in FIG. 1A.

Prior to describing exemplary embodiments of the invention in detail, some information is provided. The purpose of STC is to aid in the elimination of average radar signal return from the sea surface near the radar antenna. Sea clutter is modeled to enhance filter design, e.g., sensitivity time control (STC), to reduce the sea clutter without adversely affecting radar performance. STC attenuates relatively strong signal returns from ground clutter targets in the first few range gates of the receiver to avoid saturation from strong signal return.

Figure 2:
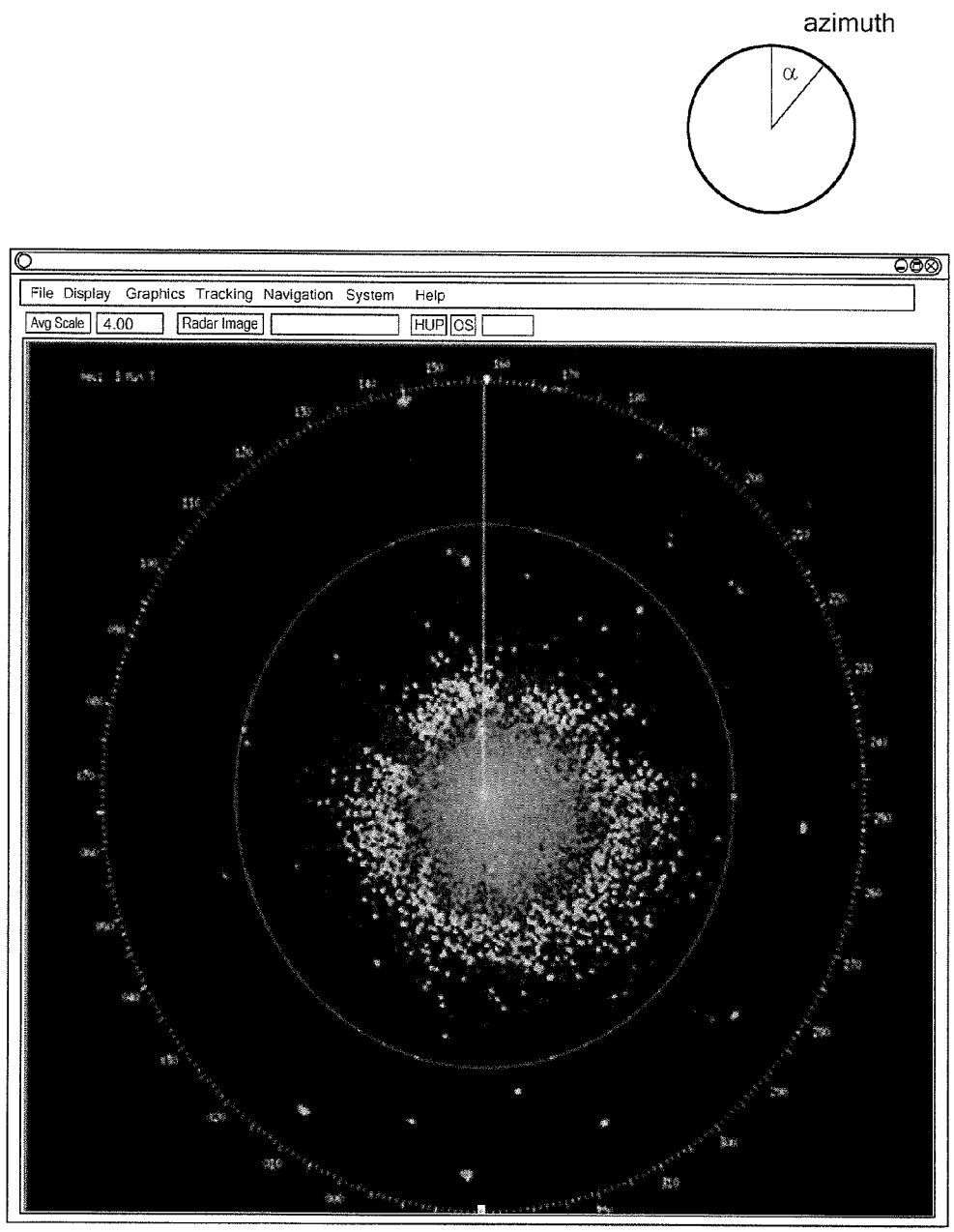
FIG. 2 is a pictorial representation of a plan position indicator (PPI) showing sea clutter return with no STC applied.

Known sea clutter models for SIC are isotropic, i.e., have the same magnitude measured. in all directions. An isotropic radiator radiates uniformly in all directions over a sphere centered on the source. However, as shown in FIG. 2, for example, sea clutter is not isotropic. That is, as can be seen the sea clutter is elongate, rather than circular. Strong winds can generate a significantly elongated sea clutter region from the perspective of the radar of interest, The illustrated return is from a navigation radar with STC turned off resulting in saturation about the radar.

In accordance with the standard Radar Equation, the average strength of sea clutter echo diminishes rapidly with increasing range from the antenna. One of the difficulties in implementing sea clutter reduction is in responding to the rapid rate of decrease in its average strength.

Figure 3:
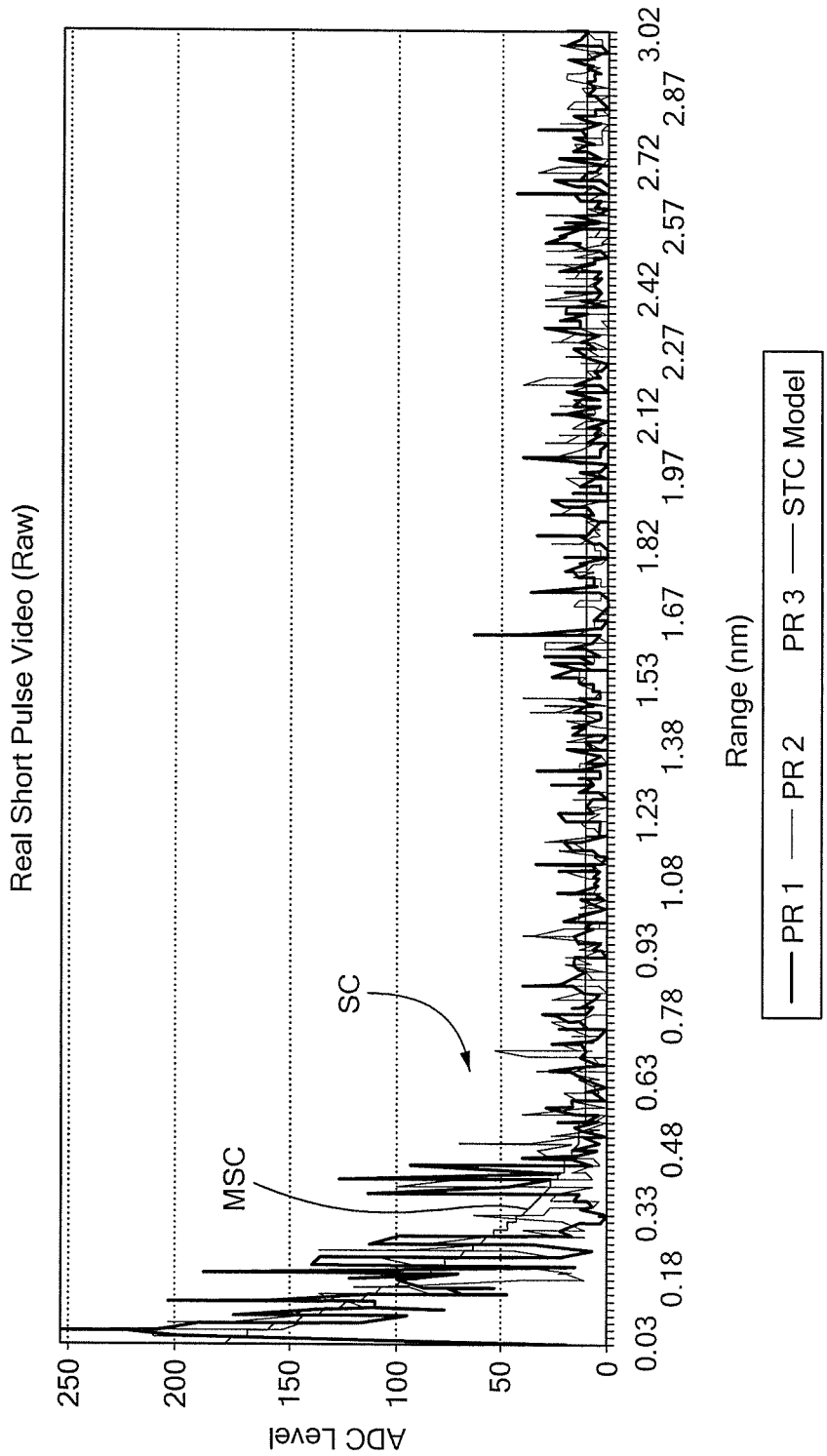
FIG. 3 is a graphical representation of recorded sea clutter amplitude return versus range.
Figure 4:
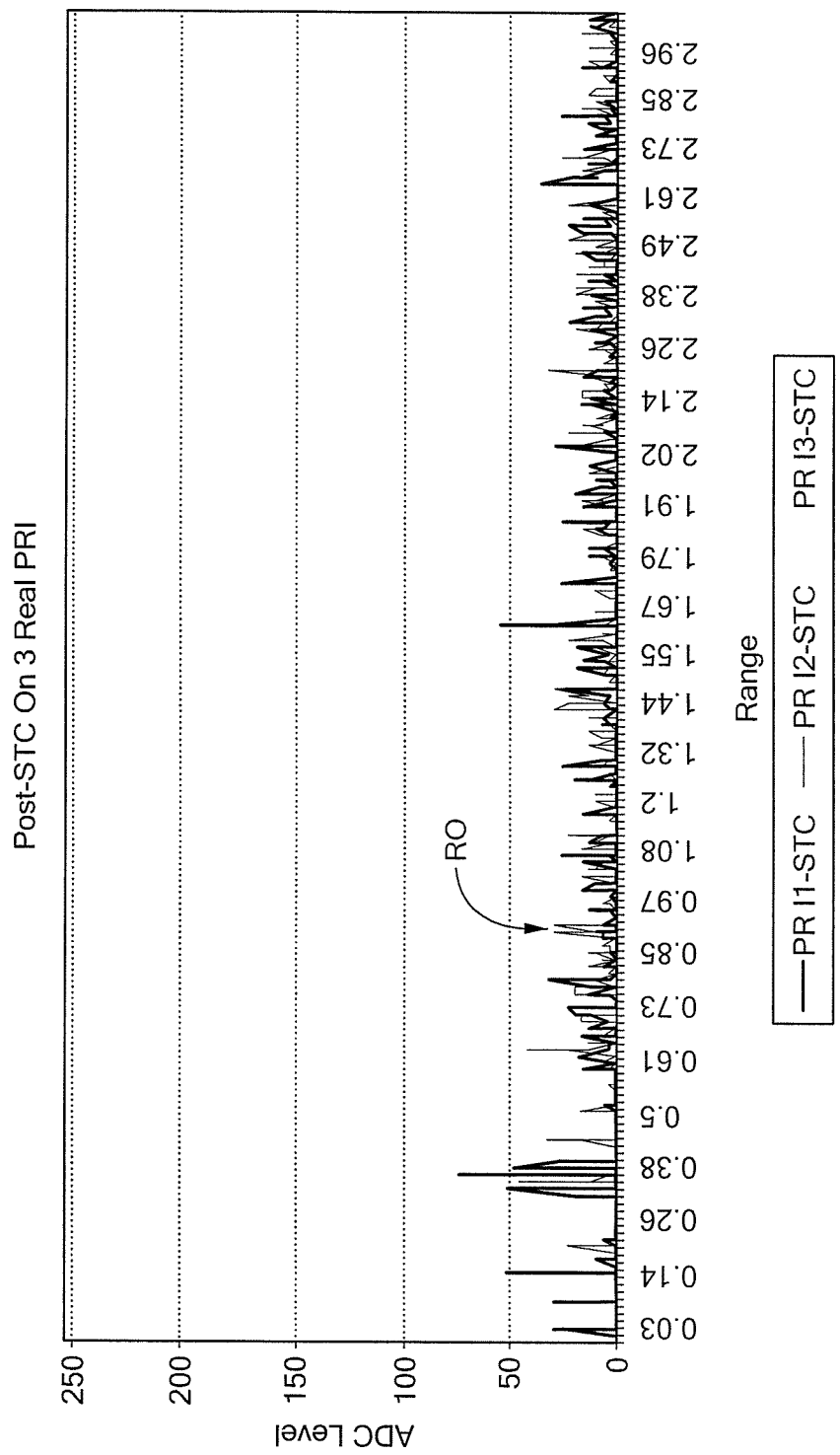
FIG. 4 is a graphical representation of flattened sea clutter over range.

FIG. 3 shows actual digital radar video demonstrating the rapid decrease in sea clutter signals SC for various pulse repetition interval (PRI) signals as they ultimately diminish to the low level of receiver noise. Also shown is an a priori smooth curve MSC to match the mean (average) shape of the actual sea clutter. As noted above, mathematical descriptions of such sea clutter models are well known. Subtracting the curve chosen to model the mean sea clutter (as a function of range), the STC function "flattens" the receiver output RO, as shown in FIG. 4.

In legacy analog systems, STC is performed in the receiver, as close to the radar antenna as possible since detection of targets at close range, as well as far range, drives the need for wide dynamic range in each system component downstream from the STC function.

In particular, older navigation radars typically terminate their analog video processing with a log-amp detector, which has a restricted dynamic range that hinders short-range detection. Modern designers have made the trade-off to spend more on wider dynamic range in the log-amp rather than implement STC in the Intermediate Frequency (IF) portion of the superheterodyne receiver. Part of the reason for this "sub-optimal" implementation of STC is the difficulty in implementing arbitrarily shaped mean sea clutter curves in analog circuits controllable for changing weather conditions.

More recent systems implement STC in analog circuits on circuit card assemblies after the log-amplifier. In these implementations, a digital curve is generated to model mean sea clutter based on sea state information from a human operator. That is, the human operator selects a sea state on perceived or measured information. The curve is transferred to a Digital to Analog Converter (DAC) whose output voltage controls a variable attenuator acting on the input analog video. This attenuation approach to STC is generally referred to as "Multiplicative STC." So-called "Subtractive STC" is shown in FIG. 4.

One flaw in traditional STC processing is that the curve selected by an operator input is fixed for all azimuth angles of antenna orientation relative to the sea, i.e., the sea clutter model is isotropic. However, it is well-known that radar sea clutter strength varies significantly with changing aspect angles from the antenna into the waves of higher sea states, e.g., larger waves. FIG. 2 depicts a rather calm sea state. Higher sea states can further elongate the sea clutter.

Figure 5:
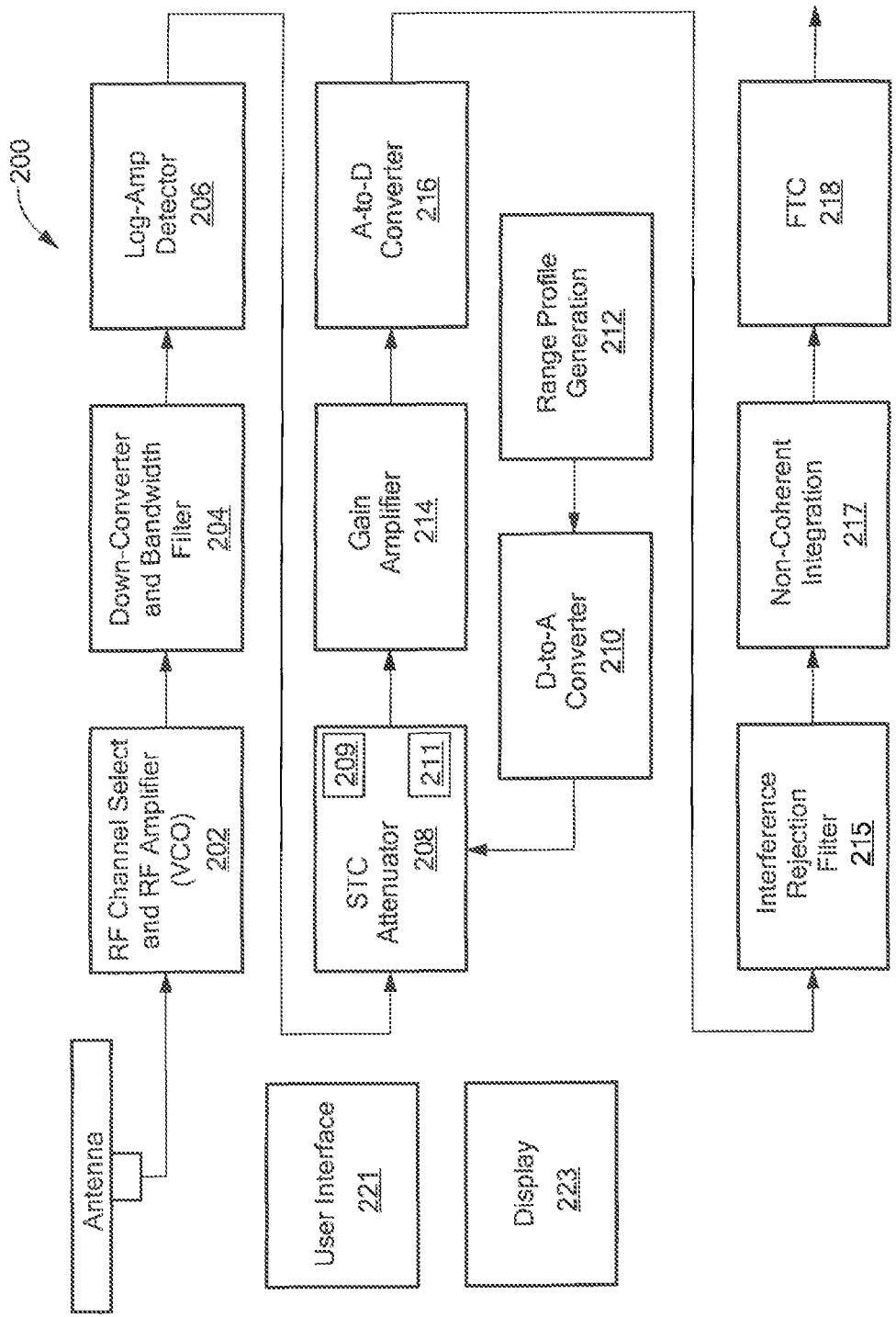
FIG. 5 is a schematic representation of an exemplary radar system providing sea state processing in accordance with exemplary embodiments of the invention.

FIG. 5 shows an exemplary radar system 200 to provide sea clutter processing and automatic sea state determination in accordance with exemplary embodiments of the invention. The system 200 includes a RF channel select and RF amplifier 202 coupled to a down-converter and bandwidth filter 204 proving input to a Log-Amp detector 206.

A STC attenuator 208 includes a sea clutter module 209 to provide sea clutter processing in accordance with exemplary embodiments of the invention. In one embodiment, the maximum detectable range sea clutter as it varies with azimuth is fitted to an ellipse. As described more fully below, a sea state module 211 determines sea state and direction from parameters of the ellipse and enables automatic (non-isotropic) STC in log-FTC receivers. Based on the detected sea state and sea clutter information, the system automatically selects STC filtering for sea clutter.

A range profile generation module 212 provides data to a Digital-to-Analog Converter module 210. Which provides information to the STC attenuator 208.

A gain amplifier 214 receives output from the STC attenuator 208 and provides data for digitization by an Analog-to-Digital converter module 216. This data then passes through an interference rejection filter module 215, a non-coherent integration module 217, and an FTC module 218. An operator can optionally interact with the system via a user interface 221. For example, a user can adjust bias settings to optimize what is shown on a display 223.

As described in U.S. Pat. No. 7,796,082 to Wood, which is incorporated by reference, a cubic polynomial can used for the STC curve. The curve can be expressed as follows:

$$STC_i = \begin{cases} \mu + \frac{\xi - \mu}{h^3}(h-i)^3, & \text{if } i \leq h \\ \mu & \text{if } i > h \end{cases}$$

where i is the range index (variable), h is the maximum range at which sea clutter is presently detectable, μ is the mean noise level in the radar, and ξ is the peak value of sea clutter at close range to the antenna. The values of μ and ξ depend primarily on the pulsewidth mode setting. The value of h (also called the clutter horizon) depends on the pulsewidth mode in use, the sea state, and the aspect angle of the antenna and the waves.

Thus, the STC curve in the '082 patent is sea state dependent. Known systems require an operator to select a sea state and manually input the sea state into the system.

Figure 6:
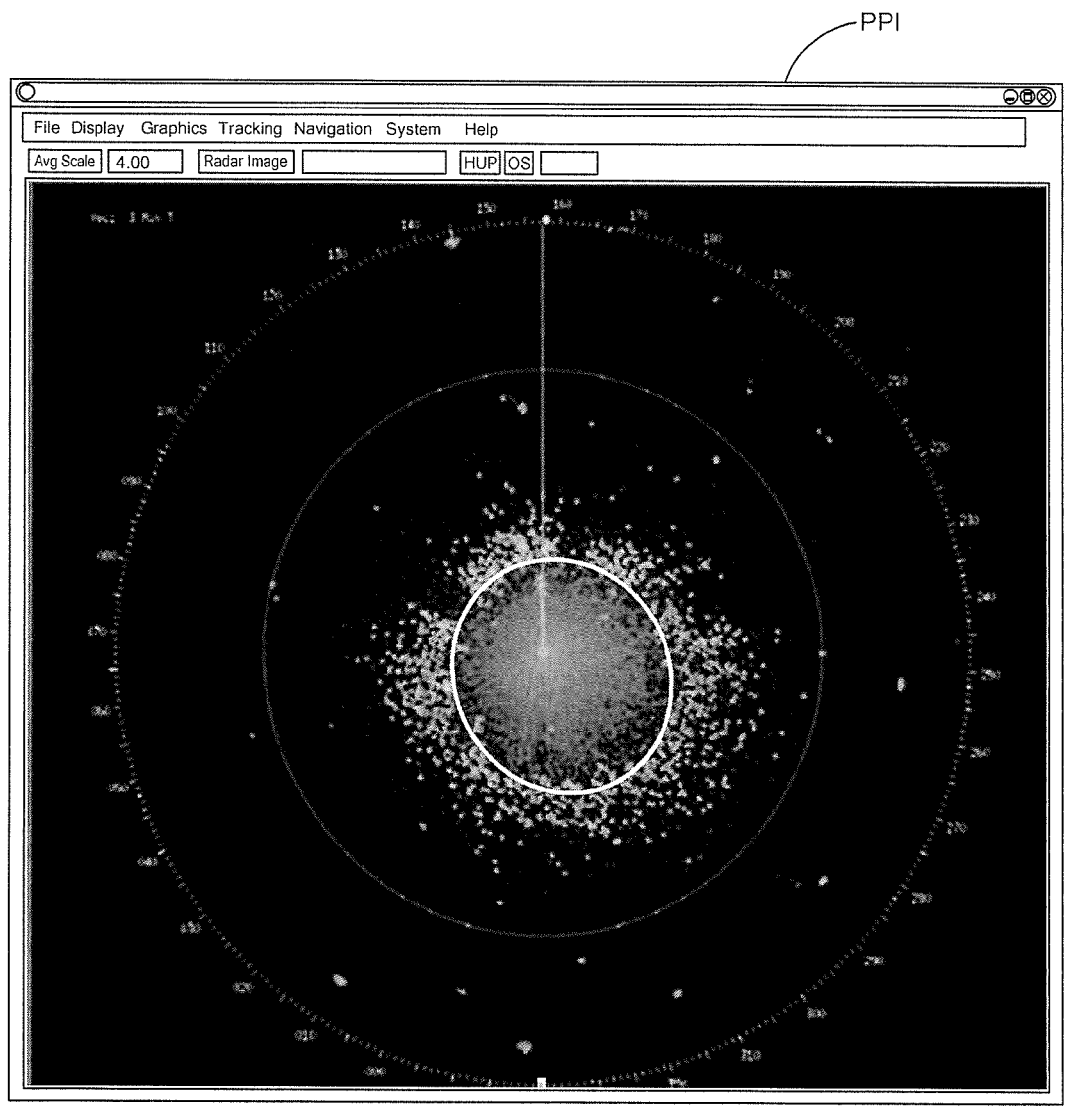
FIG. 6 is a pictorial representation of a radar return display showing elliptical sea clutter.

In one aspect of the invention, an ellipse is used to describe the outer boundary (clutter horizon) of the sea clutter detected by non-coherent radar. As shown in FIG. 6, radar sea clutter, when not filtered, can be seen easily on the Plan Position Indicator (PPI) of a shipboard navigation radar. The area near the center represents strong sea clutter, where the brighter the screen, the stronger the return. As can be seen, the sea clutter horizon forms an ellipse. The illustrated sea clutter is for sea state 1 (4 nmi PPI).

In general, exemplary embodiments of the invention use an ellipse to describe the clutter horizon as a function of azimuth and determine sea state. Using the parameters of the ellipse, the sea state and wave direction can be automatically measured with access to the unprocessed digital radar video for the radar system. The detected sea state can be used for automatic STC, as described more fully below.

Figure 7:
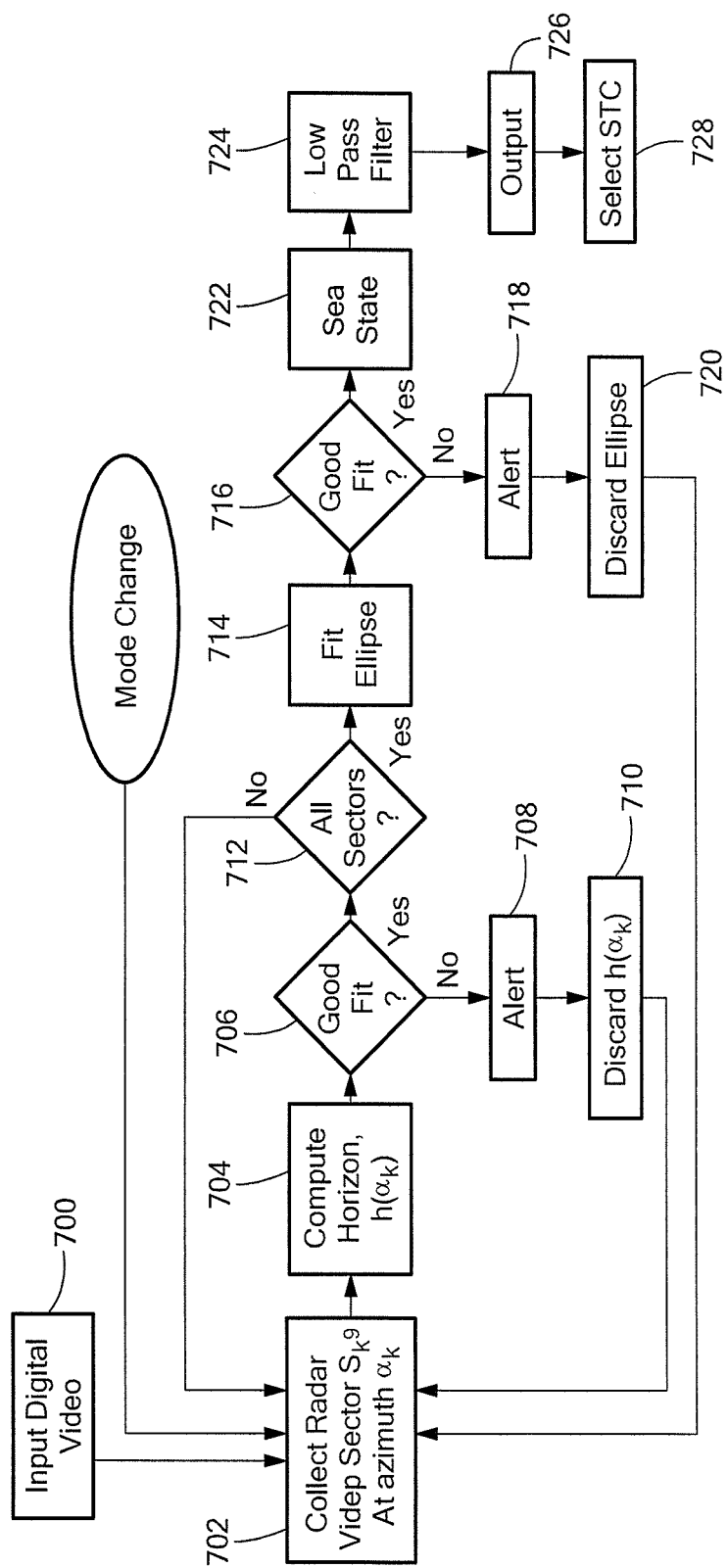
FIG. 7 is a flow diagram showing an exemplary sequence of steps for implementing sea state processing.

FIG. 7 shows an exemplary processing diagram to determine sea state in accordance with exemplary embodiments of the invention. In step 700, the digital video for the radar is input to the system. In step 702, radar video data is collected for a sector $S_k$ at azimuth $\alpha_k$. In step 704, the sea clutter horizon $h(\alpha_k)$ is computed. In step 706, it is determined whether there is a good fit, as described more fully below. If not, in step 708 an alert is generated, and in step 710 the computed horizon $h(\alpha_k)$ is discarded and processing continues for the next sector in step 702. If there was a good fit, in step 712, it is determined whether data is collected for all sectors. If so, the data is fitted to an ellipse in step 714, as described more fully below. In step 716, it is determined whether there is a good fit to the ellipse. If not, in step 718 an alert is generated, the ellipse is discarded in step 720, and processing continues in step 702. If there is a good fit to an ellipse, in step 722 the sea state is determined. It is understood that sea state can include wind direction. In step 724, the data is optionally low pass filtered and in step 726 the data is output.

In step 728, the sea state is used to automatically select STC to attenuate radar return to remove sea clutter. As described in '082 patent to Wood, since the parameters μ and ξ of the cubic polynomial are calibrated based on radar system settings, it is the clutter horizon, $h(\alpha_k)$, that varies with sea state and with azimuth. By autonomously estimating $h(\alpha_k)$ and providing it to the range profile generation module 212 of FIG. 5 the STC Attenuator 208 is allowed to vary with azimuth for the resulting improved performance in detection of small targets in clutter.

In general, alerts may be generated when approaching a port, other ships approach, or other conditions that degrade clutter horizon detection and ellipse fitting. For example, as a ship heads into port the sea clutter horizon determination becomes problematic, as will be readily appreciated by one of ordinary skill in the art. The alert can take the form of any type of signal that can be perceived by a radar operator or other personnel. Example alerts include visual indicia to a display, sounds, flashing, horns, vibrations, outgoing phone call, etc.

It is understood that processing in the various blocks can be performed in a variety of ways. For example, in one embodiment the data collection system buffers an entire 360 degree scan of radar data. In other embodiments, a fixed number of PRI, say 200, can be collected to form sectors, $S_k$, and thereby minimize the memory requirements. A determination that all sectors have been processed can be based on a single scan of 24 sectors, for example, or after multiple scans.

In one embodiment, the sea state is determined from a table containing various sea states that correspond to the ellipse parameters. For example, the eccentricity of an ellipse may correspond to a particular sea state. Sea state determination from the ellipse is described more fully below.

Figure 8:
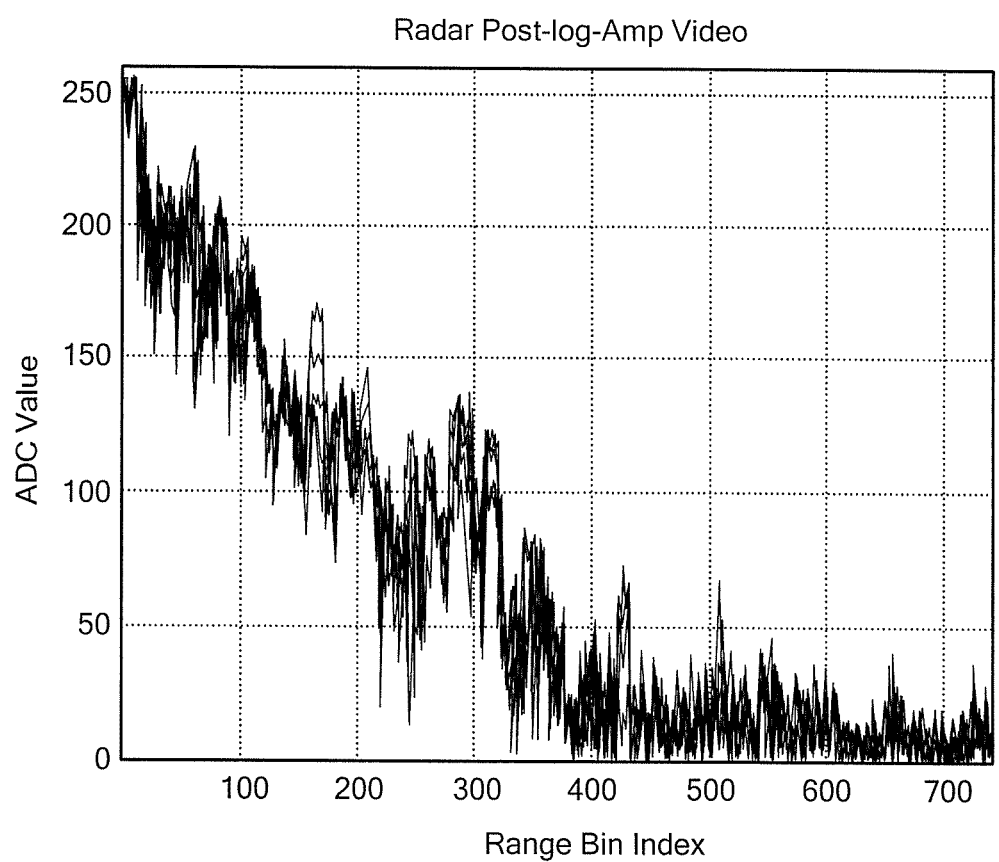
FIG. 8 is a graphical representation of range bin versus clutter.

As is known in the art, radar signals from the sea surface are very erratic, as can be readily seen in FIG. 8. The horizontal axis shows the range (in range bins of about 7.5 meters) and the vertical axis shows the signal amplitude after passing through a Log-Amp detector and an 8-bit Analog-to-Digital Converter (ADC).

Figure 9:
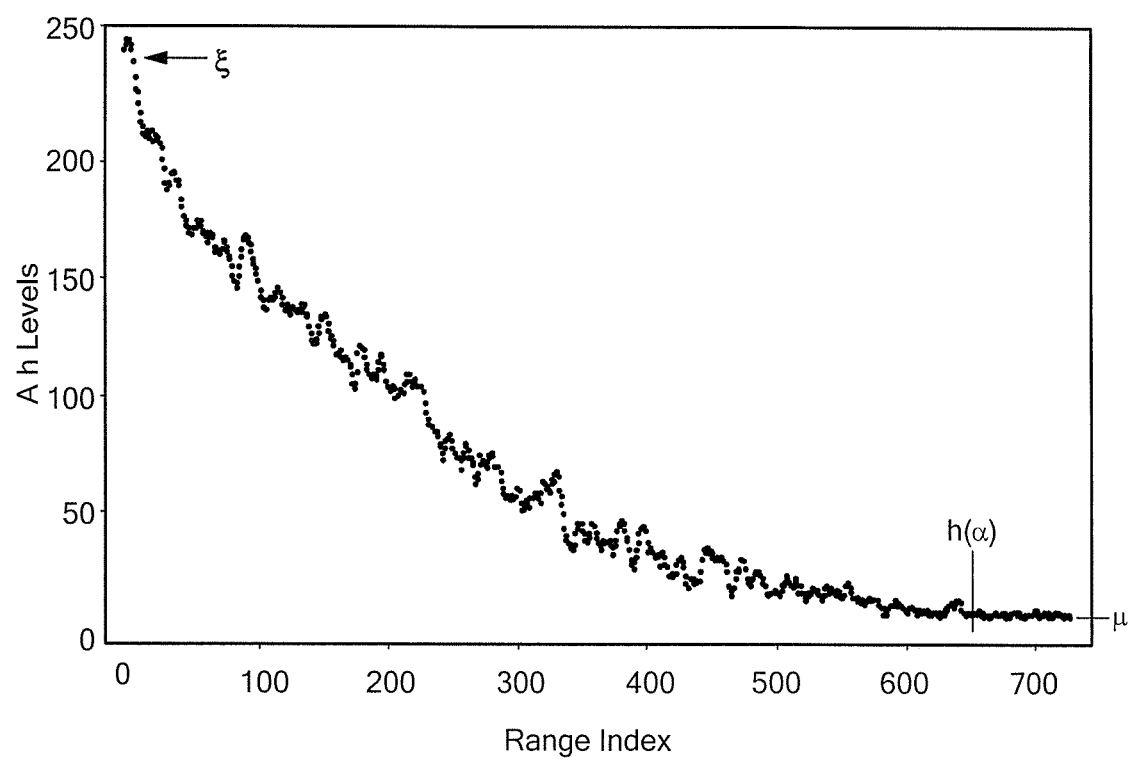
FIG. 9 is a graphical representation of model fit to mean sea clutter.

As described in the '082 patent, a sea clutter range profile model that is optimally smooth at the point where clutter descends below receiver noise, can have the form of a cubic:

$$C(r) = \text{Max}\left\{\mu, \mu + \frac{\xi - \mu}{h^3}(h-r)^3\right\},$$

where $\mu \approx 8$ in FIG. 9 is the a priori known (calibrated) mean receiver noise level, $\xi \approx 255$ is the a priori known (calibrated) peak sea clutter signal return that depends on parameters, such as pulse mode and antenna height, and h is the environmentally influenced maximum range of sea clutter. The maximum sea clutter range h is written as $h(\alpha)$, where α is the azimuth angle or aspect angle of the radar into the sea.

It should be noted that FIG. 9 shows the results of averaging about 200 PRI of sea clutter video and fitting the result to the sea clutter model above. The mean receiver noise level μ, the peak sea clutter signal return ξ, and the maximum sea clutter range $h(\alpha)$ are shown.

Further data was collected using a navigation radar having video recording with unprocessed radar video with a 12-bit ADC and returns stored from a full 360 scan of the antenna (e.g., thousands of PRI) instead of being limited to sectors of about 10-15 degrees (about 200 PRI).

Figure 10:
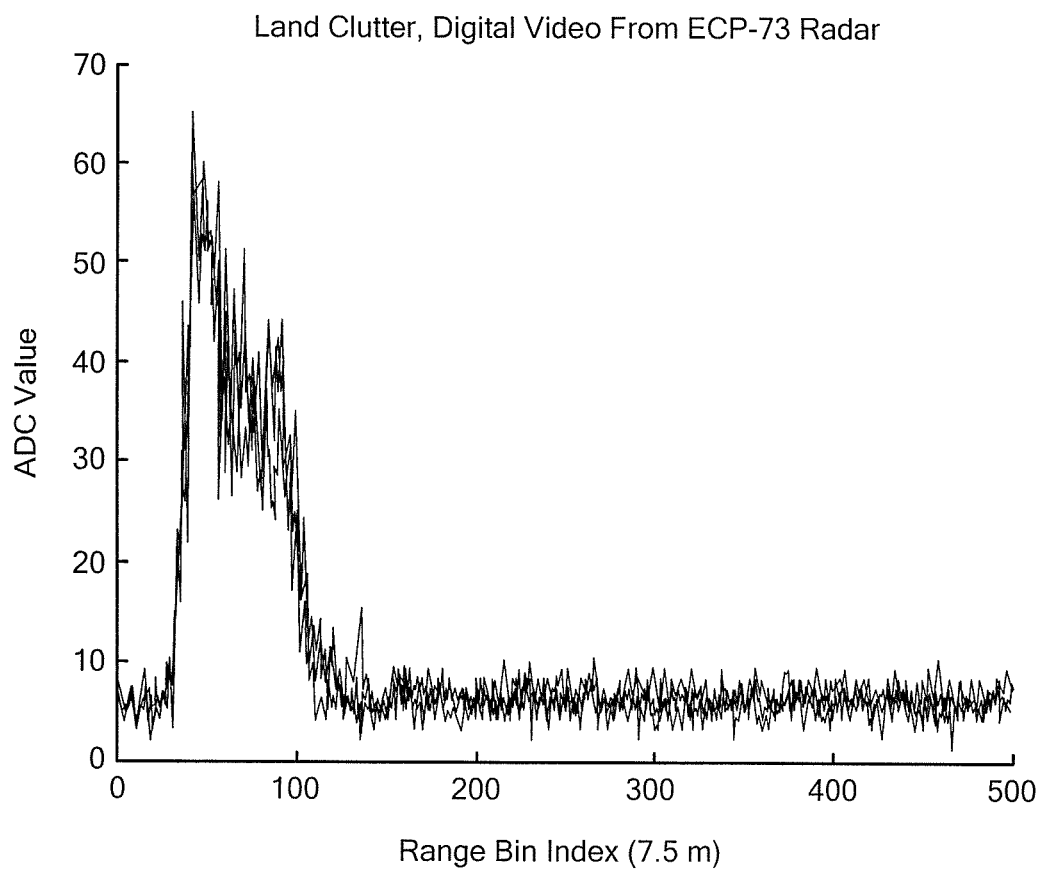
FIG. 10 is a graphical representation of range bin versus land clutter.

FIG. 10 shows collected video data from a land-based system. In comparison to the sea clutter in FIG. 8, several PRI of land clutter is shown in FIG. 10.

Figure 11:
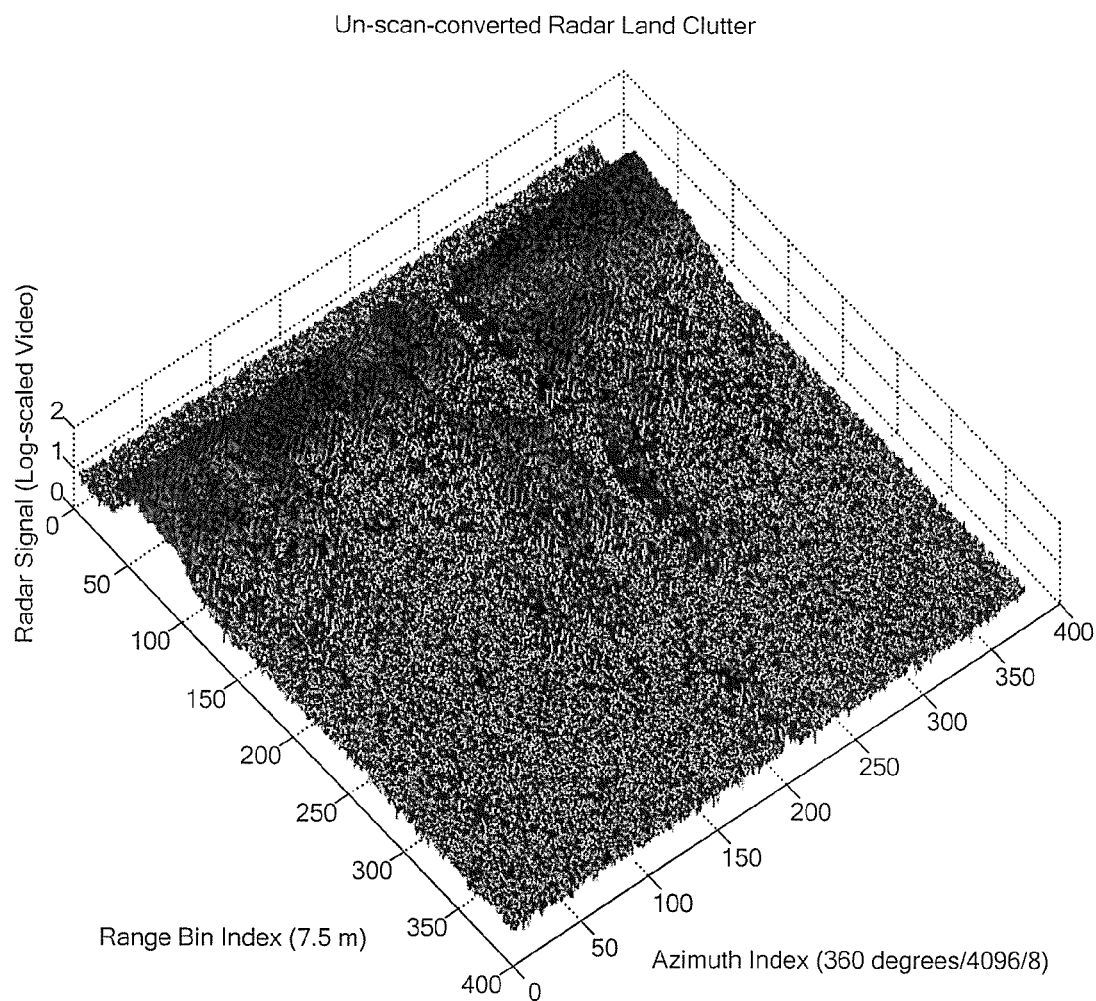
FIG. 11 is a graphical representation of raw radar video.

The collected data is stored as files referred to as "stochastic matrices", M, where M has the form $M = M(\alpha_i, r_j) = \{(\alpha_i, r_1, r_2, \ldots, r_j, \ldots): i=0, \ldots, \text{number of Azimuths per Revolution and } j=1, \ldots, \text{number of range bins per PRI}\}$. FIG. 11 shows an exemplary representation of the raw data. Each azimuth, $\alpha_i$, is a 12-bit binary number with 4095 being just a little smaller than 360°. Each range bin, $r_j$, is the 8 MSBs of a 12-bit video sample at 20 MHz. Hence, each range bin represents the signal strength at a range increment of about 7.5 meters. Recording of range bins was terminated at 6000 to save storage space. 6000*7.5/1852=24.3 nmi, which is well beyond the Earth's horizon for shipboard installations of typical navigation radars, for example.

Figure 12:
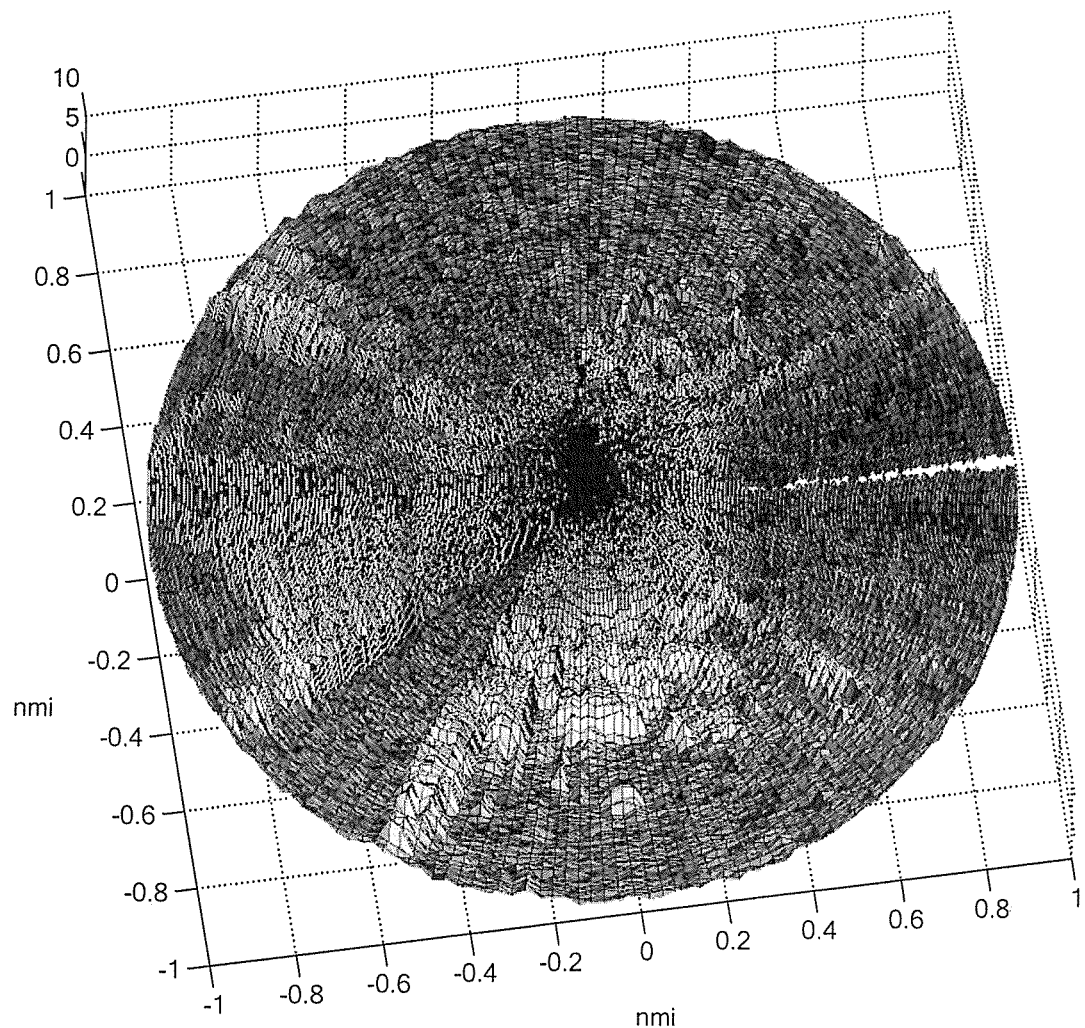
FIG. 12 is a graphical representation of the radar video of FIG. 11 in a different format.

By putting the data, M, through a scan conversion process, the image in FIG. 11 can be viewed in a more traditional form shown in FIG. 12.

For processing convenience, the data M can be reorganized from the way it is recorded into files, such as a list of the azimuth values, A={$\alpha_i$: i=0, ..., number of Azimuths per Revolution}, and a stochastic matrix, V={V(i, j): where i denotes the azimuth and j denotes the range index}.

Somewhat arbitrarily, detection of sea clutter horizon was processed in sectors of 15 degrees, thus, giving 24 sea clutter horizon estimates around the radar during each scan of the antenna. As a function of PRF, the radar gets a different number of PRI in each 15 degree sector. The number of PRI per sector impacts performance as shown in Table 1 below.

TABLE 1

Typical Number of PRI per 15 Degree Sector PRFs (S-Band or X-Band)

| PRF (Hz) | 2200 | 1800 | 1200 | 1028 | 600 |
|---|---|---|---|---|---|
| # PRI per Sector | 229 | 187 | 125 | 107 | 62 |

The entries in the table should not be viewed as exact, but rather as nominal, since the PRF is jittered, the timing is approximate. The number of PRI per section can be computed as follows:
PRI per Sector = (Scan Time/Sectors per Scan)/PRI = (2.5/24)*PRF = 0.104166*PRF.

Note that the values in Table 1 are based on a nominal antenna rotation speed of 24 RPM, and thus, a sector scan time of 104.166 ms. By virtue of the antenna scanning and the elapsed time of 104.166 ms, the range bins at a fixed range within a sector are not totally correlated. Within a shorter time, the sea clutter would be tightly correlated in range and azimuth by the smoothness of the ocean, the receiver bandwidth filter, and the beamwidth of the antenna.

The sampled radar video, V, can be described as a collection of sectors, $S_k$, where each sector contains 6000 range bins from approximately 200 PRI. Each sector has an associated azimuth, $\alpha_k$, which is the center azimuth of all the PRI with range bins in $S_k$. That is, the data is organized into 24 sectors containing roughly 200×6000 range bins.

Whether an entire scan is collected in a single buffer, or if the data is collected in a smaller buffer of 200 PRIs, one can process sectors of PRI associated with their middle azimuth, $\alpha_k$: $S_k$={$_k$(i, j): where i=1, ..., $N_k$ where $N_k$ is the number of azimuths in the sector, and j=1, ..., 6000 denotes the range index}. For each sector, the clutter horizon, $h(\alpha_k)$ is determined. The collection of {$h(\alpha_k)$: k=1, ..., 24} for at least one full scan forms a data set H to which an ellipse is fitted.

One approach to finding $h(\alpha_k)$ for a sector, $S_k$, is to form a range profile by averaging across the $N_k \approx 200$ PRI forming the sector:

$$P_k(j) = \frac{1}{N_k} \sum_{i=1}^{N_k} V_k(i, j),$$

where $V_k(i, j)$ is the $j^{th}$ range bin on the $i^{th}$ PRI of sector k. The mean noise parameter of the sea clutter model described above is calibrated and known a priori. The peak clutter return is possible to calibrate, but is also found by looking for the near-range maximum value of {$P_k(j)$: j=1, ..., 100}. A disadvantage in using the maximum versus a calibrated value is that sometimes the bow of ownship or a small boat nearby can skew the parameter.

The only remaining parameter to find is $h=h(\alpha_k)$. This can be found, for example, using a standard best least mean square algorithm. Least Mean Square techniques are well known to one of ordinary skill in the art. One feature of least squares fitting is that it provides a natural metric by which to decide if the data fits well to the model or if it fits poorly. For example, given the average range profile, $P_k(j)$, for the sector and the best least mean square fit cubic polynomial, C(j) with μ and ξ calibrated and h determined by the fitting process, the alert is issued when the residual error is too large:

Alert Issued if Residual Error =

$$\sum_{j=1}^{6000} |P_k(j) - C(j)|^2 > \text{Pre-selected Threshold Value}$$

It is understood that the threshold value can be selected to meet the needs of a particular application.

Reasons for a poor fit, and generation of an alert, to the average range profile can include: radar blanking sector, own ship wake, multi-path interference from own ship structures, targets, weather, such as rain clutter, interference, jamming, land, etc.

Since higher sea states are common with stormy weather, there may be sensitivity to rain clutter. While sea state processing may be robust with respect to isotropic rain when the precipitation surrounds the antenna for miles around, it is understood that processing may be degraded when the precipitation is an isolated squall or an approaching weather front.

In one embodiment, the sea clutter horizon $h(\alpha_k)$ is determined using Means of Ratios of Order Statistics. While particular ratios are used in an exemplary embodiment, it is understood that a range of ratios can be used. Rather than forming $P_k(j)$, we can form another range profile, Φ, through ratios of Order Statistics. We set $$\Phi_k(j) = \frac{RV(50\%, j)}{RV(90\%, j)}.$$

To compute RV(50%, j), we take the roughly 200 range bins at range bin index j, and sort them from lowest to highest. The median value at range, j, will be the middle, RV(50%, j). The roughly $180^{th}$ largest value, the $90^{th}$ percentile, is RV(90%, j). A full sort of 200 samples over 6000 range bins indices can be efficiently processed using well known sorting algorithms to generate a first trace Φ(j), in FIG. 13. A second trace in the figure is the mean clutter P(j)/ξ. A third trace TT is a low pass filter trace. Note that the way we have defined Φ, it is known that $0 \leq \Phi \leq 1$.

It is believed that the small fluctuations in trace Φ(j) at close range are due to various factors, such as the smooth, correlated waves, and the radar receiver log-amp compression of strong signals. Note that even when the mean clutter P(j)/ξ has dropped to half of its strength, Φ is maintaining a value near 0.8. Thus, as the mean is shrinking, either the median is growing (skewness) or the standard deviation is shrinking in perfect compensation.

At ranges beyond sea clutter, it is expected that the radar video contains mostly samples of receiver noise. Assuming that the receiver detector is of a square law type, the noise sample amplitudes follow an exponential law with mean parameter, $\mu$. The median value of an exponential distribution is found by solving $$0.5 = F(m) = 1 - e^{-m/\mu}.$$

Figure 13:
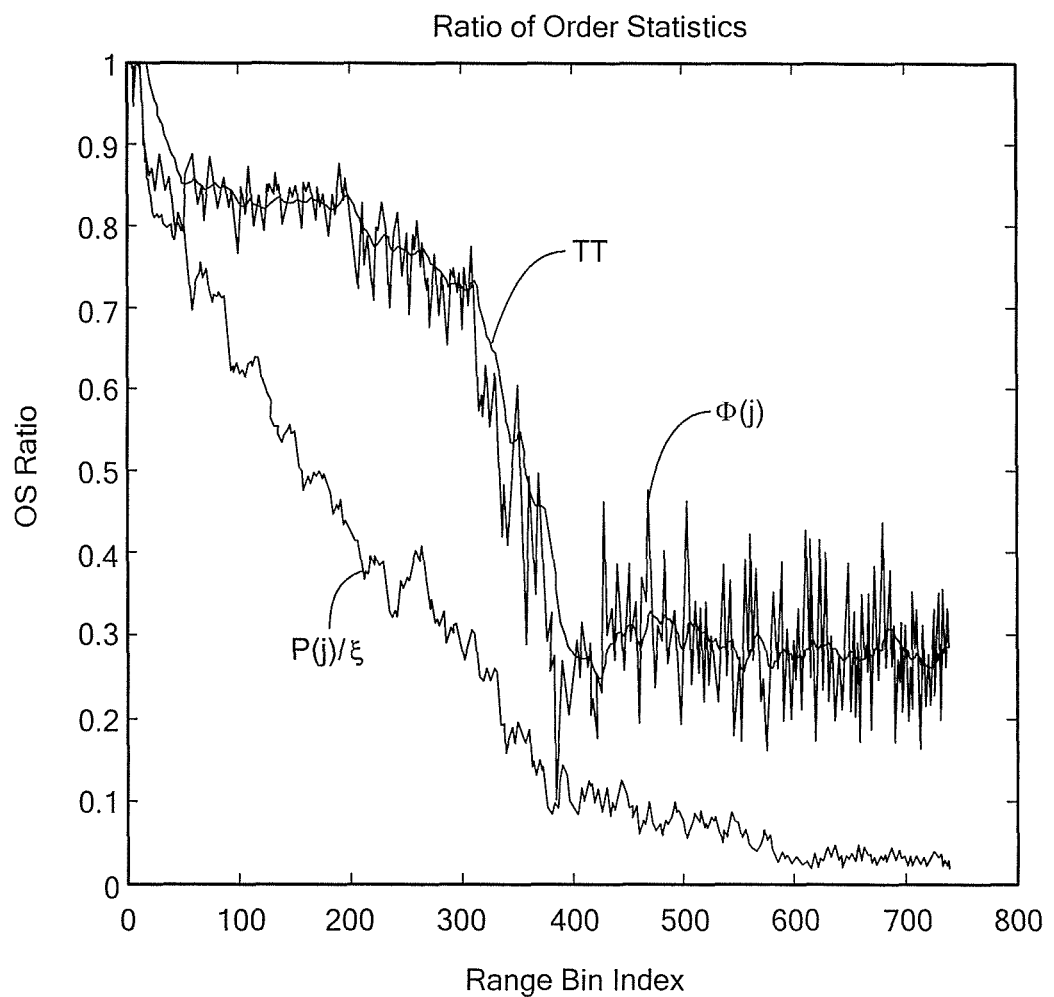
FIG. 13 is a graphical representation of clutter averages versus Order Statistic Ratios.

Hence, $m = -\mu \cdot \ln(0.50)$. With $\mu = 8$, we get RV(50%, large range indices)=5.55. The $90^{th}$ percentile is RV(90%, large range indices)=$-\mu \cdot \ln(0.1)$=18.42. The ratio, the expected value of $\Phi$ over such noise, is $E[\Phi] = \ln(0.5)/\ln(0.1) = 0.3$. As can be seen in FIG. 13, this is the value around which the $\Phi(j)$ trace fluctuates past range bin index 450.

Figures 14A, 14B:
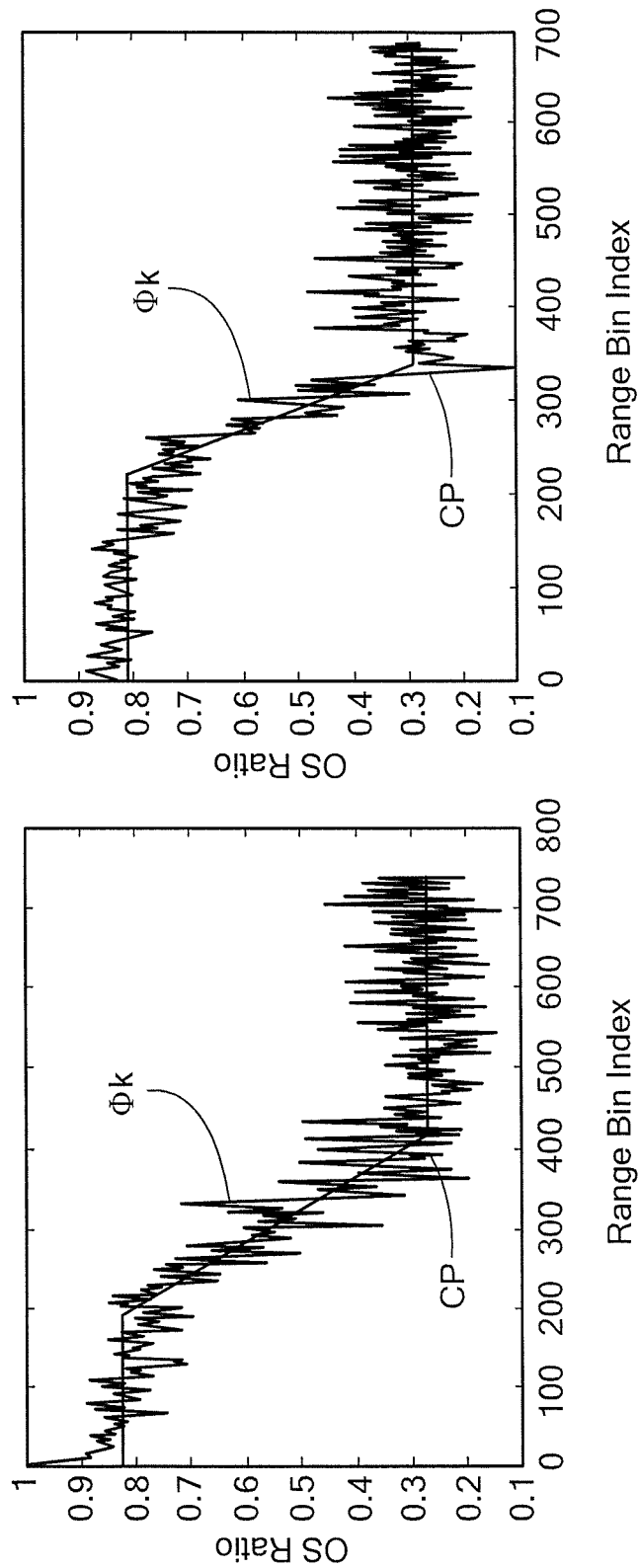
FIGS. 14A and 14B are graphical representations of Z-curves fit to respective Order Statistic Ratios.

After sorting the sector $S_k$ and finding the range profile, $\Phi_k$, as a ratio of order statistics (rank values), processing is performed to find the best fit to a "Z-curve" selected for a model for $\Phi$. Using known techniques, one can determine the coordinates of the 'corner point' CP in the Z-curve, as shown in the plots $\Phi_k$ of separate data sets and waveforms in FIGS. 14A and 14B. The range, which corresponds to the range bin index, of this corner point CP is the estimate of the sea clutter horizon $h(\alpha_k)$. Thus, an estimate of maximum sea clutter range $h(\alpha_k)$ is found as the corner point in a Z-curve fit to $\Phi_k$. It is understood that the above corresponds to step 704 in FIG. 7.

The below corresponds to step 714 of FIG. 7, i.e., fitting an ellipse to a full set of horizon samples H. In one embodiment, the system can map ratios of ellipse parameters to the sea state, thus making it insensitive to various calibrations that can be effected by magnetron decay, VCO (voltage controlled oscillator) tuning, gain and bias tuning, and the like.

There are at least two equivalent ways to describe an ellipse. In one embodiment, the more geometric approach using rotations and translations (congruences) of a standard equation is preferred as being more intuitive. However, the general quadratic relation for an ellipse may be more convenient for fitting to data. It is readily apparent that one can go back and forth between the two representations.

The equation of a standard ellipse in Cartesian coordinates (u, v) has the form:

$$\frac{u^2}{a^2} + \frac{v^2}{b^2} = 1,$$

where, if a>b, the parameter a is called the semi-major axis and b is called the semi-minor axis. This standard ellipse is centered at (0, 0) and has its axes on the coordinate axes. Every other ellipse in the Cartesian plane is the result of a rotation or translation of an ellipse in standard form. So, a general ellipse in the Cartesian (x, y) plane has the form:

$$\begin{pmatrix} x \\ y \end{pmatrix} = \begin{pmatrix} \cos(\theta) & -\sin(\theta) \\ \sin(\theta) & \cos(\theta) \end{pmatrix} \begin{pmatrix} u \\ v \end{pmatrix} + \begin{pmatrix} c \\ d \end{pmatrix}$$

This form of the ellipse identifies 5 distinguishing parameters: the semi-major and semi-minor axes, the rotation angle $\theta$, and the translation offsets c and d. Additional parameters are functions of the 5 basic ones. In particular, we highlight the eccentricity defined for a>b as $$e = \sqrt{1 - \left(\frac{b}{a}\right)^2}.$$

The eccentricity e, a unitless function of the ratio b/a, enables mapping an ellipse to sea state.

A general algebraic approach to ellipses expresses the ellipse as a certain quadratic relation:

$$c_1 x^2 + c_2 xy + c_3 y^2 + c_4 x + c_5 y + c_6 = 0.$$

To find the coefficients $c_n$, we can solve the prior vector equation for (x, y) and plug into the standard equation:

$$\begin{pmatrix} u \\ v \end{pmatrix} = \begin{pmatrix} \cos(\theta) & \sin(\theta) \\ -\sin(\theta) & \cos(\theta) \end{pmatrix} \left( \begin{pmatrix} x \\ y \end{pmatrix} - \begin{pmatrix} c \\ d \end{pmatrix} \right)$$

$$= \begin{pmatrix} \cos(\theta)(x-c) + \sin(\theta)(y-d) \\ \cos(\theta)(y-d) - \sin(\theta)(x-c) \end{pmatrix},$$

so $$\frac{(\cos(\theta)(x-c) + \sin(\theta)(y-d))^2}{a^2} + \frac{(\sin(\theta)(x-c) - \cos(\theta)(y-d))^2}{b^2} = 1$$

and we get the relationships:

$$c_1 = \frac{\cos^2(\theta)}{a^2} + \frac{\sin^2(\theta)}{b^2}$$

$$c_2 = \frac{2\cos(\theta)\sin(\theta)}{a^2} - \frac{2\cos(\theta)\sin(\theta)}{b^2}$$

$$c_3 = \frac{\sin^2(\theta)}{a^2} + \frac{\cos^2(\theta)}{b^2}$$

$$c_4 = -\left( \frac{2c \cdot \cos^2(\theta) + 2d\cos(\theta)\sin(\theta)}{a^2} + \frac{2c\sin^2(\theta) - 2d\cos(\theta)\sin(\theta)}{b^2} \right)$$

$$c_5 = -\left( \frac{2d\sin^2(\theta) + 2c\cos(\theta)\sin(\theta)}{a^2} + \frac{2d\cos^2(\theta) - 2c \cdot \cos(\theta)\sin(\theta)}{b^2} \right)$$

$$c_6 = -\left( \frac{c^2\cos^2(\theta) + 2cd\cos(\theta)\sin(\theta) + d^2\sin^2(\theta)}{a^2} + \frac{d^2\cos^2(\theta) - 2cd\cos(\theta)\sin(\theta) + c^2\sin^2(\theta)}{b^2} \right) - 1$$

Notice that a general quadratic relation of the form given above is an ellipse only if the "discriminant" $c_2^2 - 4c_1 c_3 < 0$. This can be verified as follows:

$$c_2^2 = \frac{4\cos^2(\theta)\sin^2(\theta)}{a^4} + \frac{4\cos^2(\theta)\sin^2(\theta)}{b^4} - \frac{8\cos^2(\theta)\sin^2(\theta)}{a^2 b^2}$$

$$4c_1 c_2 = \frac{4\cos^2(\theta)\sin^2(\theta)}{a^4} + \frac{4\cos^2(\theta)\sin^2(\theta)}{b^4} + \frac{4\cos^4(\theta) + 4\sin^4(\theta)}{a^2 b^2},$$

so $$c_2^2 - 4c_1 c_3 = -\frac{8\cos^2(\theta)\sin^2(\theta) + 4\cos^4(\theta) + 4\sin^4(\theta)}{a^2 b^2}$$

$$= -\frac{4(\cos^2(\theta) + \sin^2(\theta))^2}{a^2 b^2}$$

$$= -\frac{4}{a^2 b^2} < 0.$$

While the algebraic formulation of the ellipse supports ways of finding the best fit to data, one can see the challenge of deriving from them the more geometrically motivated and descriptive parameters. The conversions are set forth below:

$$c = \frac{(c_3 c_4 / 2) - (c_2 c_5 / 4)}{c_2^2 / 4 - c_1 c_3} = \frac{2 c_3 c_4 - c_2 c_5}{c_2^2 - 4 c_1 c_3}$$

$$d = \frac{(c_1 c_5 / 2) - (c_2 c_4 / 4)}{c_2^2 / 4 - c_1 c_3} = \frac{2 c_1 c_5 - c_2 c_4}{c_2^2 - 4 c_1 c_3}$$

$$a = \sqrt{\frac{2(c_1 c_5^2 / 4 + c_3 c_4^2 / 4 + c_6 c_2^2 / 4 - c_2 c_4 c_5 / 4 - c_1 c_3 c_6)}{(c_2^2 / 4 - c_1 c_3)\left[\sqrt{(c_1 - c_3)^2 + c_2^2} - (c_1 + c_3)\right]}}$$

$$b = \sqrt{\frac{2(c_1 c_5^2 / 4 + c_3 c_4^2 / 4 + c_6 c_2^2 / 4 - c_2 c_4 c_5 / 4 - c_1 c_3 c_6)}{(c_2^2 / 4 - c_1 c_3)\left[-\sqrt{(c_1 - c_3)^2 + c_2^2} - (c_1 + c_3)\right]}}$$

$$\theta = \begin{cases} 0 & \text{if } b = 0 \text{ and } c_1 > c_3 \\ \pi/2 & \text{if } b = 0 \text{ and } c_3 > c_1 \\ \frac{1}{2}\text{ArcTan}(c_1 - c_3, c_2) & \text{being sure to properly wrap the angle} \end{cases}$$

We expect to have the radar measure the clutter horizon at points sampled uniformly in azimuth. So, we expect a set of points $P_i$ in polar coordinates $H = \{(\alpha_i, \hbar(\alpha_i)): \alpha_i = 2\pi(i-1)/N$ for $i = 1, 2, \ldots, N\}$, or in Cartesian coordinates $H' = \{(\hbar(\alpha_i) \cos(\alpha_i), \hbar(\alpha_i) \sin(a_i)) \, i = 1, 2, \ldots, N\}$, where N is a reasonably small number, e.g., N=24. If H describes an ellipse around the radar, then a good estimator of the center of the ellipse is the average of the sample points in H':

$$\text{offset} = (c, \ d)^T = \begin{pmatrix} c \\ d \end{pmatrix} \approx \begin{pmatrix} \frac{1}{N} \sum_{i=1}^{N} h(\alpha_i) \cos(\alpha_i) \\ \frac{1}{N} \sum_{i=1}^{N} h(\alpha_i) \sin(\alpha_i) \end{pmatrix}.$$

If the sea is well-developed, i.e., the wind is not shifting, there is no reason to expect the clutter horizon to be asymmetrical from the radar's point of view. In other words, the offset vector $(c, d)^T$ should be parallel to the major axis of the ellipse. If the offset is not parallel, an alert can be issued, as in step 718 of FIG. 7.

If $(c, d)^T$ is reasonably parallel to the ellipse's semi-major axis, we set the estimate for the sea direction to be:

$$\theta = \text{If } \{d > 0, \text{ArcTan}(c,d), \text{ else } 2\pi + \text{ArcTan}(c,d)\}.$$

It is understood that sea state direction refers to the direction of the swells generated by wind.

After centering the measured points, the semi-major axis, a, and the semi-minor axis, b, may be found as the maximum and minimum:

$$a \approx \max\{\|P_i - \text{offset}\|, i = 1, 2, \ldots, N\} = \max\{\sqrt{(h(\alpha_i)\cos(\alpha_i) - c)^2 + (h(\alpha_i)\sin(\alpha_i) - d)^2}\}$$

$$b \approx \min\{\|P_i - \text{offset}\|, i = 1, 2, \ldots, N\} = \min\{\sqrt{(h(\alpha_i)\cos(\alpha_i) - c)^2 + (h(\alpha_i)\sin(\alpha_i) - d)^2}\}$$

Given a and b, we have the eccentricity of the sea clutter, which can be mapped to the sea state, the significant wave height, and/or the RMS wave height.

At this point, we have estimators for all 5 parameters of an ellipse: a, b, c, d, and θ. The equation for the corresponding ellipse can be derived from them:

$$\frac{x^2}{a^2} + \frac{y^2}{b^2} = 1,$$

and $$\begin{pmatrix} p_1 \\ p_2 \end{pmatrix} = \begin{pmatrix} \cos(\theta) & -\sin(\theta) \\ \sin(\theta) & \cos(\theta) \end{pmatrix} \begin{pmatrix} x \\ y \end{pmatrix} + \begin{pmatrix} c \\ d \end{pmatrix}.$$

We can measure how closely the points in data set H' match the ellipse described above, and when the match is less than a threshold, as described below, we can generate an exception and issue an alert.

In one embodiment, the error function is the sum of all of the differences between the model points $(p_1(\alpha_k), p_2(\alpha_k))^T$ and the clutter horizon measurements, $h(\alpha_k)$. An alert can be generated if the residual is great than a pre-selected value:

Alert Issued if Residual Error =

$$\sum_{k=1}^{N} \left| \sqrt{p_1^2(\alpha_k) + p_2^2(\alpha_k)} - h(\alpha_k) \right|^2 > \text{Pre-selected Threshold Value}$$

In one embodiment, the clutter is sampled repeatedly for averaging the estimates of eccentricity over time to reduce randomness. Since the sea state varies slowly, this should provide reliable results. Each set, H, is an over-sampling of the ellipse, so a least mean squares fit of a general ellipse to the points in H should provide significant noise reduction on each measurement of eccentricity.

Once fitting to an ellipse is completed, the ellipse parameters can be mapped to sea state and direction, as in step 722 of FIG. 7. Given the 5 ellipse parameters, {a, b, θ, c, d}, when θ is close to the direction of the offset vector $(c, d)^T$, either of these angles will provide a good estimate of the direction of the waves. When these angles are not reasonably close, the system considers the sea state to be immature and asserts an exception or alerts the operator. For example, FIG. 6 shows a PPI with the radar position offset from the clutter ellipse center. The wind direction appears to be from near True Azimuth of 300° or about 5 o'clock relative to the figure. The direction of the radar position offset is roughly parallel to the long axis of the clutter ellipse.

The required closeness of θ and the offset vector $(c, d)^T$ can be selected to meet the needs of a particular application. In one embodiment, the system requires θ and the offset vector $(c, d)^T$ to be within ten degrees.

A variety of ellipse parameters may be useful in determining the sea state. For example, one parameter is the eccentricity of the ellipse fitting the sea clutter horizon. Another parameter is the ratio of the length of the offset vector to the semi-major axis. It is understood that the length of the offset vector and the semi-major axis are expected to grow in higher sea states.

In symbols, we expect to find a value of $\epsilon > 0$ so that $$\text{Sea Direction} = \frac{\theta + \text{ArcTan}(-c, -d)}{2}$$

when $|\theta - \text{ArcTan}(-c, -d)| < \epsilon$,

Table 2 below shows an exemplary mapping to sea state.

TABLE 2

| WMO Sea State | Ellipse Eccentricity | $(c^2 + d^2)/a^2$ |
|---|---|---|
| 0 | <0.200 | <0.05 |
| 1 | <0.350 | <0.1 |
| 2 | <0.400 | <0.15 |
| 3 | <0.450 | <0.175 |
| 4 | <0.500 | <0.2 |
| 5 | <0.525 | <0.225 |
| 6 | <0.540 | <0.25 |

Table 3 below shows further exemplary mapping information.

| WMO Sea State | $e(c^2 + d^2)/a^2$ |
|---|---|
| 0 | <0.01 |
| 1 | <0.035 |
| 2 | <0.060 |
| 3 | <0.079 |
| 4 | <0.100 |
| 5 | <0.115 |
| 6 | <0.130 |

As the radar continuously collects sea clutter data and determines new values for the descriptors in the mapping tables, such as every few seconds, a low pass filter (step 724 in FIG. 7) can be applied to the data to prevent sea state values from jumping erratically. In one embodiment, an infinite impulse response (IIR) filter with a 10 minute time constant is used. It is understood that any suitable filter can be used to meet the needs of a particular application.

For example, set $z_n$=estimate of $e(c^2+d^2)/a^2$ on the $n^{th}$ scan of the radar after a mode change. Assume each radar scan takes 2.5 seconds. After 10 seconds, set $y_4=(z_1+z_2+z_3+z_4)/4$. Use $y_4$ as the value of $e(c^2+d^2)/a^2$ to determine the sea state via the table. On subsequent scans, n>4, use the equation $$y_n = y_{n-1} + \alpha(z_n - y_{n-1}).$$

If $y_4=0$ and $z_n=1$ for all n>4, determine how long it would take for $y_n$ to be as large as $1-1/e$ where this "e" is Euler's constant. Looking at the geometric progression $y_5=\alpha$, $y_6=\alpha+\alpha(1-\alpha)$, $y_7=\alpha+\alpha(1-\alpha)+\alpha(1-(\alpha+\alpha(1-\alpha)))=\alpha(1+(1-\alpha)+(1-\alpha)^2)$, $y_8=\alpha(1+(1-\alpha)+(1-\alpha)^2+(1-\alpha)^3)$, ..., by induction, $$y_{n+4} = \alpha \sum_{i=0}^{n-1}(1-\alpha)^i = 1-(1-\alpha)^n.$$

Solve for $\alpha$ by setting $1-(1-\alpha)^{n+1}=1-1/e$. Then, $(1-\alpha)^{n+1}=1/e$, and $(n+1)\ln(1-\alpha)=-1$. Hence, $\alpha=1-e^{-1/(n+1)}$. For a 10 minute time constant at 2.5 second updates, we get n=10*60/2.5=240, and so $\alpha=0.004$.

Similar filtering can also be applied to the estimates of the sea state direction.

It is understood that a variety of techniques can be used to fit the collected data to an ellipse. For example, a least squares curve fitting technique can be used to minimize the sum of the squares of the residuals. By minimizing the residuals, the ellipse that most closely fits to the data can be identified.

Ellipse fitting can also be performed using a Fourier Transform, such as a digital Fourier Transform (DFT). One can describe the general ellipse in a Cartesian plane with 5 parameters: a and b along with a rotation angle, $\theta$, and translation distances along the coordinate axes, c and d. Set $x=a\cos(\alpha)$ and $y=b\sin(\alpha)$ and see that any point $(x, y)^T$ on the standard ellipse is transformed to a point, P, on the general ellipse $$P = \begin{pmatrix} p_1 \\ p_2 \end{pmatrix}$$
$$= R_\theta \begin{pmatrix} a \cdot \cos(\alpha) \\ b \cdot \sin(\alpha) \end{pmatrix} + \begin{pmatrix} c \\ d \end{pmatrix}$$
$$= \begin{pmatrix} a \cdot \cos(\alpha)\cos(\theta) - b \cdot \sin(\alpha)\sin(\theta) + c \\ a \cdot \cos(\alpha)\sin(\theta) + b \cdot \sin(\alpha)\cos(\theta) + d \end{pmatrix},$$

where $R_\theta$ is a rotation matrix by the angle $\theta$. Our "clutter horizon", h, is modeled here as the length of a vector (range) from the origin to P:

$$h = \sqrt{\begin{aligned}&(a \cdot \cos(\alpha)\cos(\theta) - b \cdot \sin(\alpha)\sin(\theta) + c)^2 + \\ &(a \cdot \cos(\alpha)\sin(\theta) + b \cdot \sin(\alpha)\cos(\theta) + d)^2\end{aligned}}.$$

One estimator of the center of the ellipse is the average of the sample points in H':

$$\begin{pmatrix} c \\ d \end{pmatrix} \approx \begin{pmatrix} \frac{1}{N}\sum_{i=1}^{N} h(\alpha_i)\cos(\alpha_i) \\ \frac{1}{N}\sum_{i=1}^{N} h(\alpha_i)\sin(\alpha_i) \end{pmatrix}.$$

Once the ellipse is "centered" by subtracting $(c, d)^T$ from the data, the form of h becomes simpler:

$$h(\alpha; a, b, 0, 0, \theta) = \sqrt{\begin{aligned}&(a \cdot \cos(\alpha)\cos(\theta) - b \cdot \sin(\alpha)\sin(\theta))^2 + \\ &(a \cdot \cos(\alpha)\sin(\theta) + b \cdot \sin(\alpha)\cos(\theta))^2\end{aligned}}.$$

Figure 15:
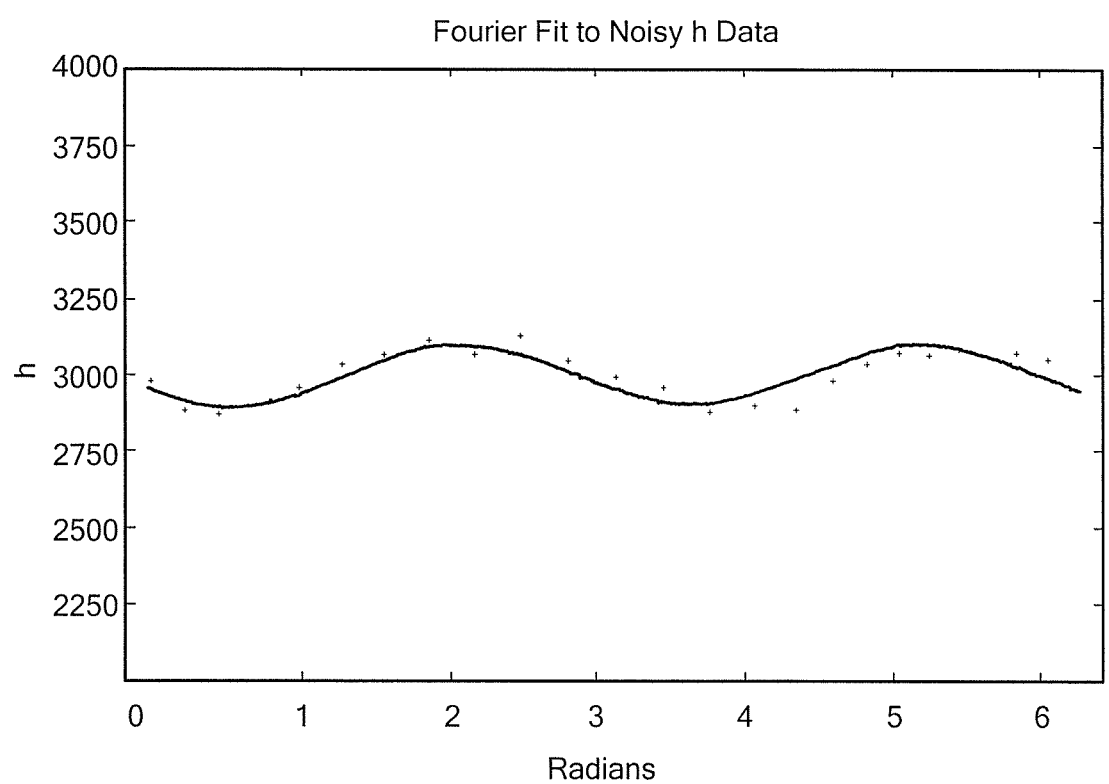
FIG. 15 is a graphical representation of radial amplitude for a centered ellipse.

This simpler form of h (with exaggerated eccentricity) is shown in FIG. 15. Characteristic of the function h for a centered ellipse is that it completes two periods as the polar angle sweeps out 360 degrees. The maxima and minima of this centered h are the semi-major and semi-minor axes of the ellipse.

The DFT applied to samples $\{h(\alpha_1), \ldots, h(\alpha_N)\}$ provides the coefficient of simpler function, f, that we chose for:

$$f(\alpha; c_1, c_2, c_3) = c_1 + c_2\cos(2\alpha) + c_3\sin(2\alpha),$$

as shown in FIG. 15.

Here, $c_1$ is the average value of h, $$c_1 \approx \frac{1}{N}\sum_{i=1}^{N} h(\alpha_i)$$

The other coefficients $c_1$ and $c_2$ are the real and imaginary parts of the output in the second DFT filter. Recall that the "h" above is the "h" after centering.

Note that the focus is not h, but rather, the ellipse parameters. The semi-major axis, a, is the maximum of the centered h and the semi-minor axis, b, is the minimum value. So to find a and b, we want to take the derivative of f with respect to α and set it equal to zero:

$$0 = -2c_2 \sin(2\alpha) + 2c_3 \cos(2\alpha),$$

so the values of interest are:

$$\tan(2\alpha) = c_3/c_2, \text{ or } \alpha_1 = \text{ArcTan}(c_3, c_2)/2 \text{ and } \alpha_2 = \alpha_1 + \pi/2.$$

Figure 16:
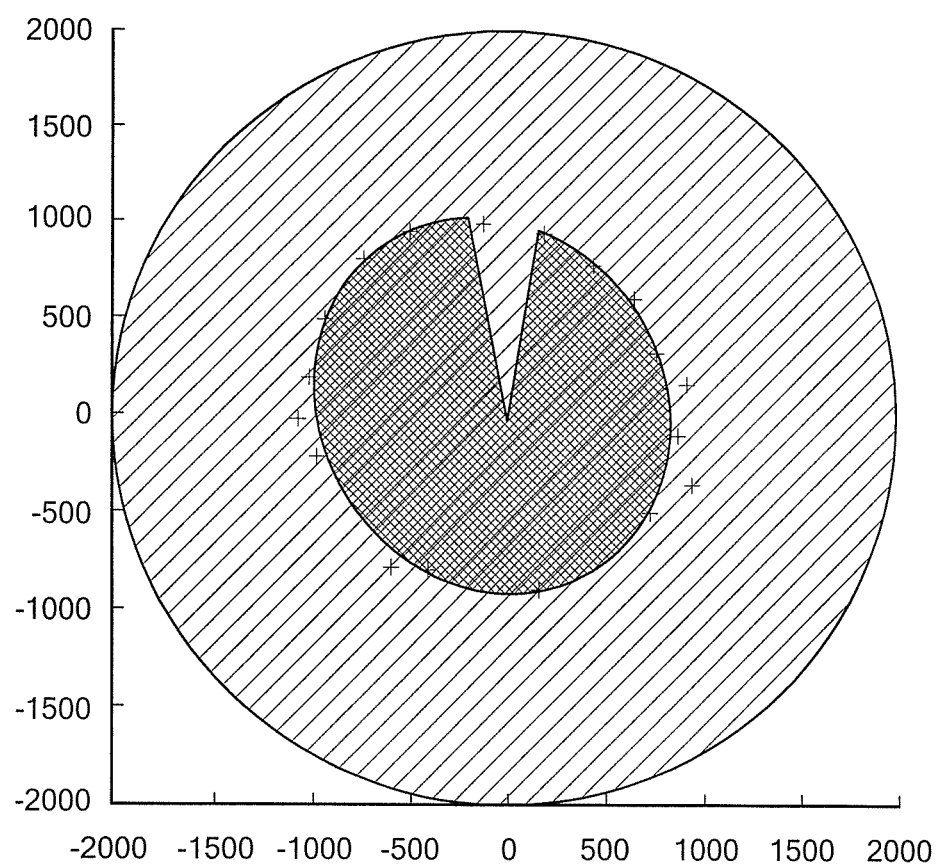
FIG. 16 is a pictorial representation of a PPI with a blank sector of sea clutter.

As shown in FIG. 16, one or more sectors of a scan can be compromised, such as by own ship wake, own ship structures, weather, nearby vessels, etc. The data for a compromised sector can be replaced so as to enable 360 degree processing. In one embodiment, data from each side of the compromised sector is averaged and used to replace the compromised sector. It is understood that a variety of techniques can be used to address compromised sectors. For example, a constrained matrix can be used, as described in A. Fitzgibbon et al, "Direct Least Square Fitting Ellipses," IEEE Trans. On Pattern Analysis and Machine Intelligence," 21(5), May 1999, 476-480.

Figure 17:
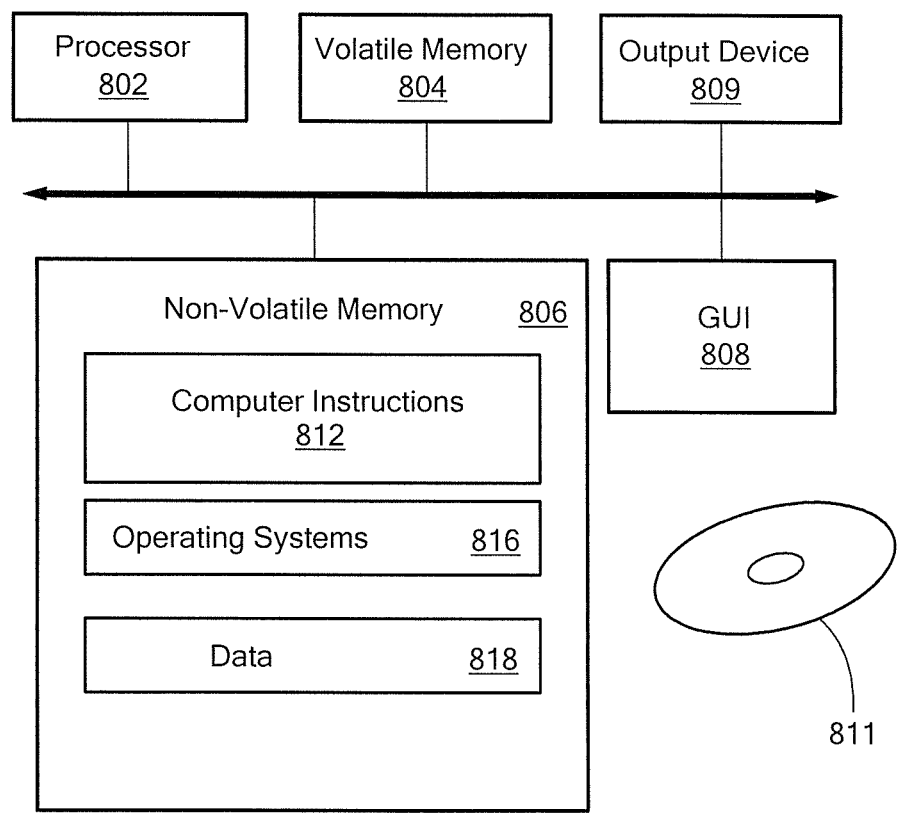
FIG. 17 is a block diagram of an exemplary computer to perform processing.

FIG. 17 shows an exemplary computer implementation to provide at least part of sea clutter processing in accordance with exemplary embodiments of the invention. A computer includes a processor 802, a volatile memory 804, a non-volatile memory 806 (e.g., hard disk), a graphical user interface (GUI) 808 (e.g., a mouse, a keyboard, a display, for example) and an output device 809. The non-volatile memory 806 stores computer instructions 812, an operating system 816 and data 818, for example. In one example, the computer instructions 812 are executed by the processor 802 out of volatile memory 804 to perform all or part of the signal return processing.

Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing to generate output information.

The system may be implemented, at least in part, via a computer program product 811, (e.g., in a machine-readable storage device), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform processing. Processing may also be implemented as a machine-readable storage medium 811, configured with a computer program, where upon execution, instructions in the computer program cause the computer to operate. While exemplary embodiments of the invention are shown having illustrative partitions between hardware and software, it is understood that other configurations and partitions will be readily apparent to one of ordinary skill in the art.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A method, comprising:
receiving radar return information from signals transmitted by a radar;
processing the radar return information to identify sea clutter; and
processing, using a processor, the sea clutter to fit an ellipse to a range horizon of the sea clutter as a function of azimuth to determine a sea state.

2. The method according to claim 1, further including determining a direction for the sea state based upon at least one parameter of the ellipse.

3. The method according to claim 2, further including determining the direction for the sea state from a direction of the major axis of the ellipse.

4. The method according to claim 1, further including generating an alert when the range horizon of the sea clutter does not fit an ellipse with a predetermined criteria.

5. The method according to claim 1, further including generating an alert when the range horizon for the sea clutter cannot be determined.

6. The method according to claim 1, further including using ratios of order statistics to form a range profile for the sea clutter.

7. The method according to claim 6, further including determining the range horizon for the sea clutter from a corner point of the range profile from the ratios of order statistics.

8. The method according to claim 1, further including determining the sea state from an eccentricity of the ellipse.

9. The method according to claim 1, further including determining the sea state from a ratio of a length of an offset of the ellipse to a semi-major axis of the ellipse.

10. The method according to claim 1, further including mapping at least one parameter of the ellipse to sea states.

11. The method according to claim 1, further including using a Fourier Transform to determine one or more parameters of the ellipse.

12. A non-transitory computer readable medium having instructions stored thereon which when executed by a processor cause a machine to:
receive radar return information from signals transmitted by a radar;
process the radar return information to identity sea clutter; and
process the sea clutter to fit an ellipse to a range horizon of the sea clutter to determine a sea state.

13. The computer readable medium according to claim 12, further including instructions for determining a direction for the sea state based upon at least one parameter of the ellipse.

14. The computer readable medium according to claim 13, further including instructions for determining the direction for the sea state from a direction of the major axis of the ellipse.

15. The computer readable medium according to claim 12, further including instructions for using ratios of order statistics to form a range profile for the sea clutter.

16. The computer readable medium according to claim 12, further including instructions for determining the range horizon for the sea clutter from a corner point of the range profile from the ratios of order statistics.

17. The computer readable medium according to claim 1, further including instructions for determining the sea state from an eccentricity of the ellipse.

18. A radar system comprising:
   an antenna configured to receive radar return; and
   a processor configured to process the radar return to identify sea clutter and fit a range horizon of the sea clutter to an ellipse to determine a sea state.

19. The system according to claim 18, wherein the processor is configured to determine a direction for the sea state based upon at least one parameter of the ellipse.

* * * * *